(12) United States Patent
Schellekens et al.

(10) Patent No.: US 8,138,245 B2
(45) Date of Patent: Mar. 20, 2012

(54) HALOGEN FREE FLAME RETARDANT POLYESTER COMPOSITION

(75) Inventors: Ronald M. A. M. Schellekens, Bunde (NL); Robert H. C. Janssen, Beek (NL); Theodorus J. G. Zwartkruis, Sittard (NL); Franciscus Vehmendahl Van, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 201 days.

(21) Appl. No.: 12/295,797

(22) PCT Filed: Apr. 2, 2007

(86) PCT No.: PCT/EP2007/002945
§ 371 (c)(1),
(2), (4) Date: Mar. 25, 2009

(87) PCT Pub. No.: WO2007/112995
PCT Pub. Date: Oct. 11, 2007

(65) Prior Publication Data
US 2009/0264562 A1    Oct. 22, 2009

(30) Foreign Application Priority Data

Apr. 4, 2006  (EP) .................................. 06075851

(51) Int. Cl.
| | |
|---|---|
| *C08K 5/34* | (2006.01) |
| *C08K 3/02* | (2006.01) |
| *C08K 5/52* | (2006.01) |
| *C08K 5/01* | (2006.01) |
| *C08K 3/30* | (2006.01) |
| *C08K 5/00* | (2006.01) |
| *C07F 9/09* | (2006.01) |
| *B32B 5/16* | (2006.01) |

(52) U.S. Cl. .......... 524/101; 524/80; 524/100; 524/127; 524/420; 524/487; 428/403; 428/407; 523/458

(58) Field of Classification Search .................. 524/101, 524/80, 100, 127, 420, 487; 428/403, 407; 523/458

See application file for complete search history.

(56) References Cited

U.S. PATENT DOCUMENTS

| 5,684,071 A | 11/1997 | Mogami et al. |
| 2002/0096669 A1 | 7/2002 | Van Der Spek |
| 2003/0083408 A1 | 5/2003 | Bienmuller et al. |
| 2003/0083409 A1 * | 5/2003 | Bienmuller et al. .......... 524/127 |
| 2004/0192812 A1 | 9/2004 | Engelmann et al. |

FOREIGN PATENT DOCUMENTS

| DE | 196 53 041 | 6/1998 |
| DE | 198 27 845 | 12/1999 |
| JP | 2000-119494 | 4/2000 |
| JP | 03-373099 | 2/2003 |
| WO | WO 2005/073316 | * 11/2005 |

OTHER PUBLICATIONS

International Search Report for PCT/EP2007/002945, mailed Jun. 4, 2007.
Database WPI Section Ch, Week 200317, Derwent Publications Ltd., London, GB; AN 1997-369652, XP002395964.
Database WPI Section Ch, Week 200038, Derwent Publications Ltd., London, GB, AN 2000433719, XP002395965.

* cited by examiner

*Primary Examiner* — Timothy J. Kugel
*Assistant Examiner* — Atnaf Admasu
(74) *Attorney, Agent, or Firm* — Nixon & Vanderhye P.C.

(57) ABSTRACT

The invention relates to a halogen free flame retardant polyester composition suitable for use as a molding composition for making lampholders, comprising (A) a polymeric material consisting for at least 50 wt. %, relative to the total weight of the polymeric material, of a thermoplastic polyester; (B) a flame retardant system in an amount of 11-35 wt. %, relative to the total weight of (A), (B) and (C), and consists of: melamine cyanurate, and optionally one or more of the following flame retardant components: another phosphorus-free nitrogen based organic flame retardant compound, a phosphorus containing flame retardant excluding elementary phosphorus, in an amount of less than 1 wt. %, relative to the total weight of (A), (B) and (C); an inorganic flame retardant synergist, and an organic flame retardant synergist (C) a fibrous reinforcing agent in an amount of 5-35 wt. %, relative to the total weight of (A), (B) and (C); and (D) a mould release agent in an amount of at least 0.01 wt. %, relative to the total weight of (A), (B) and (C).

12 Claims, No Drawings

HALOGEN FREE FLAME RETARDANT POLYESTER COMPOSITION

The invention relates to a halogen free flame retardant polyester composition suitable for use as a moulding composition for making lampholders, more particular Edison Screw lampholders and lampholders for energy saving lamps.

Up to now lampholders were generally made of flame retardant thermoplastic material compositions comprising halogen-containing flame-retardant systems. According to new WEEE regulations on electrical and electronic applications, these lampholders have to be bromine free and preferably halogen free. Halogen free flame retardant polyester compositions are known from DE-19827845-A1. According to DE-19827845-A1 there are in principle four halogen free flame retardant systems, each of which has its own problems and limitations:

- inorganic flame retardants, which have to be used in high concentration to be effective;
- nitrogen containing flame retardant systems, like melamine cyanurate, which are not effective when used as sole flame retardant in polyester;
- phosphorus containing flame retardant systems, which also are not effective when used as sole flame retardant in polyester;
- phosphorus and nitrogen containing flame retardant systems, like ammonium polyphosphate and melamine phosphate, which show insufficient thermal stability at processing temperatures over 200° C.

In DE-19827845-A1 this problem is claimed to be solved with a polyester composition comprising a mixture of flame retardants next to the polyester and other optional components:

A) 5-95 wt. % of a polyester,
B) 1-30 wt. % of a nitrogen compound,
C) 1-30 wt. % of an inorganic phosphorus compound,
D) 1-30 wt. % of an organic phosphorus compound, and optionally
E) 0-5 wt. % of an ester or amide of saturated or unsaturated C10-C40 aliphatic carboxylic acids and saturated C2-C40 aliphatic alcohols or amines, and
F) 0-60 wt. % other additives, wherein the sum of A) to F) is 100 wt. %.

The known halogen free flame retardant polyester compositions of DE-19827845-A1 typically contain, according to the examples in DE-19827845-A1: about 45-50 wt. % polyester (A), 10 wt. % melamine cyanurate or other nitrogen compound (B); 5 wt. % of an inorganic phosphorus compound (C); 10 wt. % of an organic phosphorus compound (D); and 30 wt. % glass fibres (F). The known polyester compositions of DE-19827845-A1 are said to be useful for applications including lampholders.

Apart from the polyester composition known from DE-19827845-A1, there are many flame retardant materials available in the market, including halogen free flame retardant materials, but so far the industry is still looking for a suitable material that can be used for mass production of lamp holders. Such a material must have a flame retardancy performance complying at least with the needle flame test according to IEC 60238, chapter 20.4. According to chapter 20.4, this needle flame test has to be performed according to IEC norm 60695-2-2, which norm has been replaced in the mean time by IEC 60695-11-5. Furthermore, in view of the general trend of down sizing of overall dimensions as well as of the wall thickness also in the field of lampholders, in combination with ever more complicated and critical mould designs, increasing requirements for quality and dimensional stability are posed on the materials, and the materials used must have good mechanical properties, including tensile strength, elongation at break and impact strength, as well as dimensional stability and rigidity. The material must also have good high temperature resistance, thereby retaining its good mechanical properties, and must have good processing and demoulding properties. In this respect it is it is noted that the polyester compositions in the examples of DE-19827845-A1 do not comprise a mould release agent.

From the experience of the inventors, glass fibres are necessary not only for mechanical properties, but also for good demoulding properties, next to mould release agents. This is in particular the case when critical mould shapes for the lamp holders are used. On the other hand, it is known that glass fibres can also have a negative impact on the flame retardancy properties. At the same time it is noted that the polyester compositions in the examples of DE-19827845-A1 do not comprise a mould release agent.

In view of the above the aim of the invention is to provide a halogen free flame retardant polyester composition, which has good demoulding properties, a needle flame resistance complying with norm IEC 60238, and good mechanical properties, in particular good impact properties.

This aim has been achieved with the polyester composition according to the invention, comprising (A) polymeric material, (B) a flame retardant system, (C) fibrous reinforcing agent and (D) a mould release agent, wherein (A) the polymeric material consists for at least 50 wt. %, relative to the total weight of the polymeric material, of a thermoplastic polyester;

(B) the flame retardant system is present in an amount of 11-35 wt. %, relative to the total weight of (A), (B) and (C), and consists of
  a) melamine cyanurate,
  and optionally one or more of the following flame retardant components:
  b) another phosphorus-free nitrogen based organic flame retardant compound,
  c) a phosphorus containing flame retardant excluding elementary phosphorus, in an amount of less than 1 wt. %, relative to the total weight of (A), (B) and (C);
  d) an inorganic flame retardant synergist, and
  e) an organic flame retardant synergist (C) the fibrous reinforcing agent is present in an amount of 5-35 wt. %, relative to the total weight of (A), (B) and (C); and (D) the mould release agent is present in an amount of at least 0.01 wt. %, relative to the total weight of (A), (B) and (C).

Melamine cyanurate is the name commonly used for the adduct or salt of melamine (2,4,6-triamino-1,3,5-triazine) and (iso)cyanuric acid (2,4,6-trihydroxy-1,3,5-triazine or its tautomer), as described in for example U.S. Pat. No. 4,180,496. The effect of the polyester composition according to the invention, comprising melamine cyanurate as the main flame retardant component, optionally with other flame retardants and flame retardant synergists but comprising only very low amounts of phosphorus containing flame retardant, or even with melamine cyanurate as the sole flame retardant component in the amount of 11-35 wt. %, relative to the total weight of (A), (B) and (C), next to the said polymeric material composition, the fibrous reinforcing agent and the mould release agent, is that the polyester composition passes the needle flame test according to the IEC norm IEC 60695-11-5 performed with a flame application time of 10 seconds according to IEC 60238 on injection moulded standard test plates having a thickness of 1 mm, and wherein the flame is applied at the side of the test plate opposite to the injection gate. It is noted herein that IEC 60695-11-5 allows this test to be performed in different ways, and on different places of the moulded parts. The inventors have modified this test in a standard material test, which has been compared with, and has shown to have a good correspondence with tests performed on moulded end products. It has also been found that the compositions according to the invention, even when comprising relatively high glass contents, and with melamine cyanurate as essentially the only flame retardant, still comply with the required needle flame test. It has also been found that a lampholder made of a composition according to the invention performed well both in the notched impact test and in demoulding tests, whereas corresponding compositions without glass fibres as well as a corresponding compositions without demoulding agent showed serious demoulding problems. The corresponding compositions without fibrous reinforcing agent also showed too low a notched Charpy impact resistance, while the corresponding compositions with higher content of flame retardant and fibrous reinforcing agent showed too low a tensile strength and/or elongation at break.

From the experience of the inventors, glass fibres are necessary not only for mechanical properties, but also for good demoulding properties, next to mould release agents. This is in particular the case when critical mould shapes for the lamp holders are used. On the other hand, it is known that glass fibres can also have a negative impact on the flame retardancy properties. Surprisingly, the composition according to the invention comprising the combination of glass fibres, mould release agent and melamine cyanuyrate in the appropriate amounts results in a good overall balance in properties, including processing and demoulding behaviour, mechanical properties and flame retardancy property, while no additional flame retardants like phosphorous flame retardants and flame improving agents like epoxy containing polymers are needed.

From JP-08/269,306-A and JP-09/157,503-A flame retardant polyester compositions comprising melamine cyanurate and mould release agents are known. These compositions however contain less than 10 wt. % glass fibres and also contain esters of phosphoric acid in amounts higher than the amount of 1 wt. % as according to the present invention. These patent applications do not relate to compliance with the needle flame test as according to the present invention.

In U.S. Pat. No. 4,180,496 polyester compositions with polybutylene terephthalate (PBT) as the polyester and comprising 20 and 30 mass % melamine are disclosed that would show improved flame-proofing compared to PBT without flame retardant. However, these PBT compositions neither comprise glass fibres nor mould release agent and needle flame resistance is not given.

Polyester composition comprising glass fibres in combination with melamine cyanurate without phosphorus containing flame retardant are also mentioned in several other patents, however either in compositions as comparative experiment to demonstrate that melamine cyanurate alone is not an effective flame retardant, or in compositions in which melamine cyanurate is combined with one or more flame retardant synergists.

In DE-19653042-A1 a composition consisting of 55 wt. % PBT, 20 wt. % melamine cyanurate and 25 wt. % glass fibres is disclosed as comparative experiment, next to a composition consisting of 55 wt. % PBT, 15 wt. % melamine cyanurate, 25 wt. % glass fibres and 5 wt. % of a copolymer of ethylene and acrylic acid. The copolymer of ethylene and acrylic acid is an organic flame retardant synergist and in order to be effective it must have a minimum amount of acrylic acid units. In DE-19653042-A1, melamine cyanurate is mentioned to be a sufficient flame retardant in non-reinforced thermoplastic compositions. DE-19653042-A1 neither relates to the needle flame test nor mentions polyester composition with mould release agent.

In JP-2000119494-A a composition consisting of 59 wt. % polyethylene terephthalate (PET), 10 wt. % melamine cyanurate, 30 wt. % glass fibres, 0.5 wt. % of an epoxy compound and 0.5 wt. % heat stabilizer is disclosed as comparative experiment, next to other compositions comprising a talc as an organic flame retardant synergist, and preferably also a phosphorus type flame retardant. The amount of the talc in the examples is at least 5 wt. %. For improving the CTI an amount of 1-15 wt. % of a compressed fine powder talc is used. The polyester compositions in JP-2000119494-A do not comprise a mould release agent and JP-2000119494-A is silent about the performance of the compositions in a needle flame test.

Polyester compositions with melamine cyanurate, as sole flame retardant are described in U.S. Pat. No. 5,684,071. In several of the examples PET compositions are disclosed with glass fibre reinforcement present in an amount of 30 wt. %, whereas examples of PBT compositions do not comprise glass fibres. The polyester compositions disclosed in this patent comprise melamine cyanurate treated with an organic additive having two functional groups. The functional groups are, for example epoxy, anhydride or oxazoline groups. The additive having two functional groups is said in U.S. Pat. No. 5,684,071 to be needed to improve a range of properties, including the flame retarding properties, rated as UL-94 test results and LOI. In two comparative examples in U.S. Pat. No. 5,684,071, two glass fibre reinforced PET compositions are disclosed comprising respectively no flame retardant and 20 wt. % of melamine cyanurate, wherein the melamine cyanurate is not treated with the said additive having two functional groups. The flame resistance according UL-94 is reported. The latter glass fibre reinforced PET composition, comprising the untreated melamine cyanurate did not show any reported improvement in flame retardancy in comparison with the glass fibre reinforced PET composition void of any flame retardant component. U.S. Pat. No. 5,684,071 does not describe polyester compositions comprising a mould release agent and is silent about the flame retardancy performance in a needle flame test.

A patent application dealing with a needle flame test is JP-2004107431-A. The compositions disclosed in the patent application concern epoxy resin powder coating containing a phosphorus containing melamine compound as flame retardant. The patent application does not relate to polyester compositions for lamp holders as according to the present invention.

The polyester composition according to the invention suitably comprises less than 1 wt. % epoxy containing compounds, preferably less than 0.5 wt. % or even less than 0.1 wt. % epoxy containing compounds and most preferably, the polyester composition comprises no epoxy containing compounds at all. The wt. % herein is relative to the total weight of the polyester composition. Suitably, the said epoxy containing compounds include epoxy containing polymers.

Analogously, the polyester composition suitably comprises less than 1 wt. %, preferably less than 0.5 wt. % or even less than 0.1 wt. % relative to the total weight of the polyester composition of one or more compounds having functional groups selected from the group consisting of carboxylic anhydride groups, isocyanate groups, oxazoline groups, carbodiimide groups, aziridinyl groups and cyanate groups. Most preferably, the polyester composition comprises no compounds having functional groups selected from the said group.

The thermoplastic polyester that is used in the composition according to the invention, suitably is an amorphous polyester or a semi-crystalline polyester, and preferably is a semi-crystalline polyester with a melting temperature (Tm) of at least 200° C. More preferably the thermoplastic polyester is a semi-crystalline semi-aromatic polyester. Said semi-crystalline semi-aromatic polyester is generally derived from at least one aromatic dicarboxylic acid or an ester-forming derivative thereof and at least one (cyclo)aliphatic or aromatic diol, and includes homo—as well as copolymers. Examples of suitable aromatic diacids include terephthalic acid, isophthalic acid, naphthalene dicarboxylic acid, biphenyl dicarboxylic acid, etc., with terephthalic acid being preferred. Suitable diols include for example alkylene diols, hydroquinone, dihydroxyphenyl, naphthalene diol. Alkylene diols, like ethylene diol, propylene diol, 1,4-butylene diol or butane diol, neopentyldiol, and cyclohexane dimethanol are preferred. These semi-aromatic polymers may further comprise small amounts of, for example, aliphatic dicarboxylic acids, functional alcohols and/or carboxylic acids and three or higher functional alcohols and/or carboxylic acids, provided that these polyesters remain melt-processable. Preferably, the content of other monomers in these polyesters is below 20 wt. %, below 10 wt. %, more preferably below 5 wt. %, relative to the total weight of the polyester, to ensure the semi-crystallinity of the polyester.

Suitable semi-aromatic thermoplastic polyesters that can be used in the composition according to the invention are, for example, polyalkyleneterephthalates, polyalkylene naphthalates, and polyalkylene bisbenzoates and any copolymers and any mixtures thereof. These polyesters can be derived from alkane diols and, respectively terephthalic acid, naphthalene dicarboxylic acid and 4,4'-diphenyldicarboxylic acid.

Suitably, the polyalkyleneterephthalate is poly(1,4-cyclohexanedimethylene terephthalate) (PCT) or a poly(alkylene terephthalate) based on an aliphatic diol with 2 to 6 carbon atoms, like polyethyleneterephthalate (PET), polytrimethyleneterephthalate (PTT), and poly(1,4-butylene terephthalate) or simply called polybutylene terephthalate (PBT).

Suitable poly(alkylene naphthalate)s include polyethylenenaphthalate (PEN) and polybutylenenaphthalate (PBN). Suitable polyalkylene bisbenzoates include polyethylenebisbenzoate (PEBB) and polybutylenebisbenzoate (PBBB). Suitably, these semi-aromatic thermoplastic polyesters comprise a minority content of another dicarboxylic acid or diol.

Of these polyesters, PET, PTT, PBT, PEN, PTN, PBN, and any mixture or copolymer thereof are preferred. More preferably the thermoplastic comprises PET or even consists of PET, since PET shows a better performance in the needle flame test.

The thermoplastic polyester in the polymeric material (A) of the composition according to the invention preferably present in an amount of at least 70 wt. %, more preferably at least 90 wt. %, and still more preferably at least 95 wt. %, relative to the total weight of the polymeric material. The advantage is that the polyester composition has better retention of mechanical properties at elevated temperature.

The polyester composition according to the invention optionally comprises a polymer different from the thermoplastic polyester, which polymer is denoted herein as an "other polymer". If present, this other polymer makes up part of the polymeric material (A).

Suitably, the other polymer has a weight average molecular weight (Mw) of at least 10,000. Also suitably, the other polymer is a thermoplastic polymer or a functional polymer, such as an impact modifier, a compatibilizer, a carrier polymer for an additive, or a polymeric flame-retardant synergist.

Suitable thermoplastic polymer, that can be used as the other polymer, or part thereof, include polyolefines, polyamides and polycarbonates. Preferably, the other polymer comprises or is a polycarbonate.

As impact-modifier generally a rubber material is used, preferably comprising or consisting of functionalised copolymers that are compatible with or reactive towards the polyester and having a $T_g$ below ambient temperature, preferably below 0° C., −20° C. or even below −40° C. Examples of suitable impact-modifiers are styrenic, olefinic or (meth) acrylic copolymers with acid, acid anhydride, or epoxy functional groups, like a copolymer of ethylene, methylmethacrylate and glycidyl methacrylate or a maleic anhydride-functionalised copolymer of ethylene and propylene. Also suitable as impact-modifier are acrylonitrile butadiene styrene copolymers (ABS), styrene butadiene styrene copolymers (SBS) or hydrogenated versions thereof (SEBS), methacrylate butadiene styrene (MBS), or core-shell polymers having an acrylate rubber core and a shell comprising a vinyl aromatic compound and/or a vinyl cyanide and/or an alkyl (meth)acrylate. An effective amount of impact-modifying polymer is generally about 1-15 wt. %, preferably 3-10 wt. %, relative to the weight of the polymeric material (A).

The polymeric flame-retardant synergist suitably is a fluoro polymer or a polyvinyl pyrolidone, which both can act as an anti-dripping agent. The fluor polymer suitably is a fluor containing polyethylene. Such a polyethylene preferably comprises fluor in an amount of 55-76 wt. %, more preferably 70-76 wt. %, relative to the weight of the fluor containing polyethylene. Details about suitable fluor containing polyethylene are mentioned in patent application DE-19827845, page 12.

If present, the polymeric flame-retardant synergist preferably is present in an amount of 0-2 wt. %, more preferably 0-1 wt. % and still more preferably 0-0.5 wt. %, relative to the weight of the polymeric material (A).

Compatibilizers are generally used in combination with a blend of the thermoplastic polymer with an immiscible other polymer. The other polymer also suitably is a mixture of a combination of at least two of any the other polymers mentioned here above.

As is clear from the objective of the present invention, the other polymers that can be used in the composition according to the invention shall be used in such an amount that the basic requirements including the mechanical and flammability properties are still met. The person skilled in the art can simply determine the amounts in which the other polymers can be used by routine experiments.

Preferably, the other polymer is present in a total amount of 0-10 wt. %, preferably 0-5 wt. % and still more preferably 0-2 wt. %, relative to the total weight of the polymeric material (A).

In the polyester composition according to the invention, the melamine cyanurate is preferably present in an amount of 11-35 wt. %, more preferably 12-30 wt. %, and still more preferably 15-25 wt. %, relative to the total weight of (A), (B) and (C). The advantage of a higher minimal amount of melamine cyanurate is that the flame retardant properties are further improved, whereas above the maximum level hardly any improvement is seen in the needle flame test. This improvement can be made demonstrated by needle flame tests performed on test plates with a lower thickness, for example with a thickness of 1 mm. The advantage of a lower maximum amount of melamine cyanurate is that the mechanical properties are further improved.

The melamine cyanurate that is used is preferable of small particle size, or can be easily dispersed into small particles in a polyester continuous phase during mixing. Suitably, melamine cyanurate has a particle size distribution with 50 wt. % of the particles (d50) smaller than about 50 micrometer (μm); preferably particle size is below 25, below 10, or even below 5 μm.

In the polyester composition according to the invention, melamine cyanurate can be the sole flame retardant or can optionally be combined with other flame retardant components. Whereas melamine cyanurate as the sole flame retardant is sufficient to pass the needle flame test, the other flame retardant components can be used to improve the flame retardancy performance.

Suitably, the polyester composition according to the invention comprises one or more of the following components in relatively small amounts relative to the melamine cyanurate: phosphorus-free nitrogen based organic flame retardant compound, phosphorus containing flame retardant, inorganic flame retardant synergist, organic flame retardant synergist.

The term 'phosphorus-free nitrogen based organic flame retardant compound' is understood herein to be a flame retardant compound excluding melamine cyanurate, consisting of carbon atoms, hydrogen atoms and nitrogen atoms, and optionally other heterogeneous atoms like oxygen atoms, but excluding phosphorus atoms.

The nitrogen based organic flame retardant compound in the composition according to the invention suitably is selected form the group of triazines (such as melamine based compounds), guanidines, cyanurates, isocyanurates, and mixtures thereof, as well as organic and inorganic salts thereof. Suitable salts of the nitrogen based organic flame retardant compounds are, for example, borates and oxalates. Examples of suitable salts include melamine-neopentylglycolborate, and guanidine sulfate.

Preferably the nitrogen based organic flame retardant compound is a melamine based compound. Suitable melamine based compounds are compounds selected from the group consisting of melamine and condensation products of melamine, and mixtures thereof. Suitable melamine condensation products are for example melam, melem, and melon, and higher condensation products of melamine. Melamine condensation products can, for example, be obtained with the process described in WO-A-96/16948.

More preferably, the nitrogen based organic flame retardant compound is a melamine condensation product or a mixture thereof.

Suitable the phosphorus-free nitrogen based organic flame retardant is present in an amount of 0-10 wt. %, preferably 0-5 wt. %, still more preferably 0-2 wt. %, relative to the total weight of (A), (B) and (C).

The phosphorus containing flame retardant may be any phosphorus containing flame retardant, including nitrogen and phosphorus containing flame retardants, as long as the amount is less than 1 wt. %, preferably 0-0.5 wt. % and more preferably 0-0.2 wt. %, relative to the total weight of (A), (B) and (C).

The inorganic flame retardant synergist may be any inorganic compound that further improves the flame retardant properties of the inventive polyester composition. Suitably, this inorganic compound is talc, a metal oxide, a metal sulphide or a metal borate. An example of a suitable metal borate is zinc borate.

Suitably, the inorganic flame retardant synergist is used in an amount of 0-5 wt. %, preferably 0-2 wt. %, and still more preferably 0-1 wt. %, relative to the total weight of (A), (B) and (C).

The organic flame retardant synergist may be any organic compound that further improves the flame retardant properties of the inventive polyester composition. Suitably, this organic compound is an organic compound having functional groups chosen from the group consisting carboxyl groups, epoxy groups, oxazoline groups, carboxylic anhydride groups, isocyanate groups, carbodiimide groups, aldehyde groups, aziridinyl groups and cyanate groups, and any combination thereof.

Suitably, the organic compound has a with a Mw of less than 10,000.

Suitably, the organic flame retardant synergist is used in an amount of 0-5 wt. %, preferably 0-2 wt. %, and still more preferably 0-1 wt. %, relative to the total weight of (A), (B) and (C).

The composition according to the invention preferably comprises less than 0.1 wt %, relative to the total weight of (A), (B) and (C), of an organic additive having two functional groups, wherein the functional groups can be chosen from the group mentioned above. Most preferably, the content is 0 wt. %, i.e. no such additive having two functional groups is used at all. The advantage of the polyester composition according to the invention being void of such additives is that the polyester composition is less expensive and more economic to prepare while still showing a good performance in the needle flame test.

Also preferably, the optional flame retardant components of the flame retardant system (B) are present in a total amount of 0-5 wt. %, preferably 0-2 wt. %, still more preferably 0-1 wt. %, and most preferably 0-0.5 wt. %, relative to the total weight of (A), (B) and (C).

The fibrous reinforcing agent in the polyester composition according to the invention may be any fibrous reinforcing agent that can suitably be used in polyester compositions used in injection moulding applications. Suitably fibrous reinforcing agents are, for example, glass fibres, carbon fibres, potassium titanate fibres, and needle shaped mineral fillers with a length/diameter or aspect ratio L/D of at least 10/1. An example of such a needle shaped mineral filler is wollastonite. For the fibrous reinforcing agent, glass fibres like E-glass is particularly preferred. Such glass fibres can be used in the standard commercially available forms of rovings and chopped glass fibres. Where applicable, these fibrous reinforcing agents can be surface treated with a silane compound for better compatibility with the thermoplastic polymer.

Preferably, the fibrous reinforcing agent is present in an amount of 5-35 wt. %, preferably 7-35 wt. %, more preferably 7-30 wt. %, more preferably 10-27, more preferably 12-25 wt. %, and most suitably 15-20 wt. %, relative to the total weight of (A), (B) and (C). The advantage of the fibrous reinforcing agent being present in a higher minimum amount as well as in a lower maximum amount is that the mechanical properties of the polyester composition is further improved.

The mould release agent that can be used in the polyester composition according to the invention may be any compound that improves the demoulding of moulded parts in a moulding process, like injection moulding, wherein the polyester composition is shaped into moulded parts. Suitably, the mould release agent is an organic compound with an Mw of less than 10,000. Also suitably, the mould release agent is a saturated fatty acid or derivative thereof, an ester or amide of saturated or unsaturated C10-C40 aliphatic carboxylic acids and saturated C2-C40 aliphatic alcohols or amines, or a fluorinated polyolefine. Derivatives of saturated fatty acids include esters based on polyols, amides based on polyamines, and metal salts based on alkali and alkali earth metals or other metals like zinc. Examples of suitable mould release agents include ethylenebisstearylamide, pentaerhytrytoltetrastearate and montanate waxes. The mould release agent may also be any combination of two or more of these compounds.

In the polyester composition according to the invention, the mould release agent is preferably present in an amount of 0.05-2 wt. %, more preferably 0.1-1 wt. %, and most preferably 0.2-0.5 wt. %, relative to the total weight of (A), (B) and (C).

The polyester composition according to the invention may optionally comprise, next to claim 1, components (A)-(D) one or more other additives (component E).

Suitable additives that may be comprised in the composition according to the invention include the usual additives, such as fillers, plasticizers, CTI improving agents, nucleating agents, stabilizers, dispersing aids, pigments, colorants, etc.

Fillers are understood herein to be inorganic particle shaped materials, which may function both as a reinforcing agent and as an extender. The particles may have different shapes but are explicitly non-fibrous. These filler materials can have various forms, including globular, platelet or needle-like shapes. If the filler is needle-like, its aspect ratio is below 10, preferably below 8. Examples of suitable inorganic fillers include glass beads, silica, calcined and non-calcined clay, mica, talc, kaolin, calcium carbonate, magnesium carbonate, etc. Where applicable, these fillers can be surface treated, like the fibrous reinforcing agents, with a silane compound for better compatibility with the thermoplastic polymer.

The composition according to the invention may comprise the filler in an amount varying over a wide range, generally 0-30 wt. %, preferably 0-20 wt. %, still more preferably 0-10 wt. %, relative to the total weight of (A), (B) and (C). Ultimately, the polyester composition according to the invention does not comprise filler at all. For example talc is suitably used as filler, for example next to glass fibre reinforcement, in an amount of 0-10 wt. %, preferably 0.1-5 wt. % and more preferably 1-3 wt. %, relative to the total weight of (A), (B) and (C).

A CTI improving additive or additives may advantageously be added if a higher CTI value is required. If a CTI improving additive is used at all, the amount thereof preferably is 0.01-5 wt. %, preferably 0.05-1 wt. %, still more preferably 0.1-0.5 wt. %, relative to the total weight of (A), (B) and (C).

Suitable additives for improving the CTI include, for example, a polar polymers like polyolefines, such as polyethylene and/or ethylene copolymers, inert fillers, like barium sulphate and metal borates, such as calcium borate and zinc borate, and compressed pulverized talc. The CTI improving additive is suitably used in an amount of 0-5 wt. %, for example 0-3 wt. %, preferably 0-1 wt. %, relative to the total weight of (A), (B) and (C). If the CTI improving additive consists of or comprises compressed pulverized talc, the amount thereof preferably is less than 1 wt. %, more preferably less than 0.5 wt. %, or even less than 0.1 wt. %, relative to the total weight of (A), (B) and (C). Ultimately, the amount of CTI improving agent is 0. to the total weight of (A), (B) and (C).

Suitable nucleating agents are, for example, sodium benzoate, sodium phenylphosphinate, aluminium oxide, silicium oxide, and talc, and preferably sodium benzoate or talc. These nucleating agents suitably used in an amount of 0-5 wt. %, preferably 0-1 wt, relative to the total weight of (A), (B) and (C).

Suitable stabilizers include, for example, UV-stabilizers, heat stabilizers and anti-oxidants, or combined thermo-oxidative stabilizers.

Examples of suitable combined thermo-oxidative stabilizers include sterically hindered phenol compounds, sterically hindered amines and phosphates, secondary amines like diphenylamine, hydrochinone, and combinations thereof. Thermo-oxidative stabilizers are suitably used in an amount of 0-2 wt. %, preferably 0.1-1 wt. %, relative to the total weight of (A), (B) and (C).

As suitable UV stabilizers, various substituted resorcinol compounds, salicylic acid derivatives, benzotriazoles and benzophenons can be mentioned. UV stabilizers are suitable used in an amount of 0-3 wt. %, preferably 0.1-2 wt. %, relative to the total weight of (A), (B) and (C). Preferably, no UV stabilizer is used.

The polyester composition according to the invention may also contain colorants or dyes and pigments, like inorganic pigments and organic pigments. Examples of inorganic pigments include titanium dioxide, ultramarine blue, iron oxide and carbon black. Examples of inorganic pigments are phthalocyanine, quinacridone, perylene. Examples of colorant are nigrosine and anthrachinone. Pigments and colorant are generally used in low amounts, such as 0-1 wt. %, relative to the total weight of (A), (B) and (C). Preferably, the composition comprises pigments, which can be activated by laser light, and/or the colour of the composition is not very dark or black, in order to allow the moulded part made from the polyester composition to be marked with a dark laser marking. The advantage thereof is that the laser marking is better visible and has a better contrast with the lighter background colour. Most preferred are relatively light colours, like white, off-white, beige, or grey, like the light-grey colour RAL 7035, which is frequently used in E&E applications.

Generally, the other additives are present in a total amount of at most 50 wt. %, relative to the total weight of (A), (B) and (C). Preferably, the composition according to the invention comprises the other additives in a total amount of 0-30 wt. %, more preferably 0-20 and still more preferably 0-10 wt. %, relative to the total weight of (A), (B) and (C).

In a preferred embodiment of the invention, the polyester composition consists of:
  (A) the polymeric material consisting for at least 90 wt. %, relative to the total weight of the polymeric material, of PET, PTT, PBT or a mixture or copolymer thereof;
  (B) the flame retardant system consisting of melamine cyanurate in an amount of 11-35 wt. %, and optionally one or more of the components (B-b), (B-c), (B-d) and (B-d) in a total amount of (B-b), (B-c), (B-d) and (B-d), of 0-5 wt. %;
  (C) the fibrous reinforcing agent in an amount of 7-30 wt. %;
  (D) the mould release agent in an amount of 0.1-1 wt. %; and
  (E) the optional at least one other additive, preferably chosen from the group consisting of inorganic fillers, plasticizers, CTI improving agents, nucleating agents, UV-stabilizers, heat stabilizers, anti-oxidants, dispersing aids, pigments and colorants, and mixtures thereof, in a total amount of 0-10 wt. %,
wherein the wt. % mentioned in (B), (C), (D) and (E) are all relative to the total weight of (A), (B) and (C).

The polyester composition according to the invention can be prepared by any customary manner for making injection moulding flame retardant polyester compositions. Suitably, the polyester composition is made by melt blending the various components in a melt-mixing device. Suitable melt mixing devices are, for example, extruders, especially twin-screw extruders, most preferably with co-rotating screws.

The polyester and other components may be first mixed as a dry blend and than fed to the melt mixing device. In an alternative method, the polyester and the optional other polymers are dosed to and molten in the melt mixing device, thereby forming a polymer melt, and the melamine cyanurate and the optional other flame retardant components, optionally pre-blended with other additives, are added the polymer melt. The advantage thereof is better control over the maximum temperature during compounding, and better dispersing of components into the polyester. Suitably, the melamine cyanurate is added in the form of a masterbatch of melamine cyanurate in a carrier polymer. Also suitably, the fibrous reinforcing agent is added after the polymer melt has been formed.

In another special embodiment, the composition obtained after mixing and compounding is subjected to a heat-treatment, preferably at a temperature close to, but below the melting point of the polyester polymer, and under reduced pressure or a flow of an inert gas. Such a process is also known as solid-state post-condensation. This heat-treatment will increase the molar mass and hence the relative viscosity of the polyester in the composition and improve mechanical properties of the composition.

The invention also relates to a process for making a moulded part from the polyester composition according to the invention. Preferably such a part is made via an injection moulding process.

The invention also relates to a moulded part for use in electrical or electronic applications, wherein the part is moulded from a polyester composition according to the invention.

Suitably, the moulded part is a connector or a housing for an electrical circuit breaker or switchgear, a contactor, a motor starter, or a fuse holder. The moulded part may also be, for example, a housing for a lamp or a base for an energy saving lamp.

Preferably, the part is a lampholder made of a polyester composition according to the invention or any preferred embodiment thereof. Suitably, the lampholder is an Edison screw lampholder or a lampholder for an energy saving lamp.

The part may further be provided with a dark marking on a lighter background surface.

The invention will now be further illustrated by means of the following examples and comparative experiments.

Materials

PET, $\eta_{rel}$=1.58, measured at 25° C. and at 1 wt. % in m-cresol, from DSM, The Netherlands Mecy: MC50, melamine cyanurate from CIBA Geigy, Switzerland, $d_{50}$=8 µm Glass fibres: Vetrotex 952, EC10 4.5 mm, from supplier Vetrotex NA: Nucleating agent: sodium benzoate E221, from Univar Benelux MRA-1: Paracera C40, Carnaubawax, a mould release agent from Paramelt B.V.

Preparation and Testing of Pet Compositions According Examples I-IV and Comparative Experiments A-E PET compositions according to the invention (Examples I-IV) as well as PET compositions used as comparative materials (Comparative Experiments A-E) were compounded, injection moulded and tested as described below. The compositions and test results have been reported in Table 1.

Compounding and Post-Condensation of PET Compositions (Examples I-IV and Comparative Experiments A-E)

The PET compositions were made from a dry premix of a PET/MeCy (45% MeCy) masterbatch and solid components in dry conditions. The components were melt-mixed using a Berstdorff 2548D co-rotating twin-screw extruder with degassing at a set temperature of 260-270° C. Speed of 300 revolutions/minute was used and throughput 35 kg/hour. The resulting melt was extruded in strands, cooled and cut into granules. The PET granules obtained from the compounding step were post-condensed in a tumble drier to increase PET molecular weight. The materials were treated at 205° C., under vacuum 5 mbar and nitrogen, during 10 hours. The final viscosity of the polymers in the post-condensed materials, measured on 1 wt. % solutions in m-cresol at 25° C. was typically in the range of 1.71-1.75.

Injection-Moulding

The PET granules obtained after the compounding and post-condensation step were used to make test specimen by injection moulding. Prior to the injection moulding the granules were dried for 24 hours at 120° C. Moisture content of the dried materials was below 0.01 wt. %.

For the injection moulding of test specimens, an injection-moulding machine of type Engel 80 A was used with set temperatures of 260-280° C. The mould temperature was 135° C. Test plates for the needle flame test were made according to ISO 294. A mould with a single cavity with dimensions 80×80×1 mm, gated by a film of 0.75 mm was used. The cycle time for the test specimens was about 45 sec.

Test Methods

Mechanical Properties

The Charpy notched impact test was performed according to ISO 179/1eA using dry-as-moulded samples.

Flammability

For the flammability of the materials the needle flame test according to IEC norm 60695-11-5 was performed. This method describes all details about flame characteristics, positioning of the flame in respect of the test plate, and use of wrapping tissue to be put underneath the test sample. First the test plate to be tested was placed in up-right position, such that the side with the injection gate was at the top. Then the flame was applied underneath the test plate at the middle of the lower side of the plate opposite to injection mould gate. The flame application time was 10 seconds. To pass the test, flames and glowing of the test specimen has to extinguish within 30 seconds after removal of the needle flame. Furthermore, there should be no ignition of the wrapping tissue underneath the test sample due to dripping of burning material.

Resistance to Heat

For the temperature resistance test lampholders were produced with some of the experimental materials on a commercial production line for lampholders. The lampholders thus produced were subjected to an elevated operating temperature 35° C. above the rating temperature e.g. 215° C. for T180 or 245° C. for T210, according IEC 60238. After the heat treatment at the elevated operating temperature, the lampholders were subjected to an impact test according to IEC 60238, chapter 19. The lampholders were rated as pass or fail in respect of the corresponding rating temperature.

Compositions and Test Results

The compositions for the Examples (EX I-IV) and Comparative Experiments (CE A-E), as well as the results for demoulding behaviour observed in the injection moulding trials, the mechanical properties, the flame-retardant behaviour in the needle flame test, and the T180 and T210 tests are given in Table.

TABLE 1

PET compositions according to Examples I-IV (EX I-IV) and
Comparative Experiments (CE A-E) and related test results

| Composition | CE-A | CE-B | CE-C | EX I | CE-D | EX II | CE-E | EX III | EX IV |
|---|---|---|---|---|---|---|---|---|---|
| PET | 80 | 70 | 82.2 | 72.2 | 74.6 | 64.6 | 59.6 | 49.6 | 39.6 |
| Glass fibres | 0 | 0 | 7.5 | 7.5 | 15 | 15 | 30 | 30 | 30 |
| MRA-1 | 0 | 0.3 | 0.3 | 0.3 | 0.3 | 0.3 | 0.3 | 0.3 | 0.3 |
| NA | 0 | 0 | 0.1 | 0.1 | 0.1 | 0.1 | 0.1 | 0.1 | 0.1 |
| Mecy | 20 | 30 | 10 | 20 | 10 | 20 | 10 | 20 | 30 |
| Demoulding[a] |  | -- |  | + | ++ | ++ |  | ++ |  |
| Charpy Notched [kJ/m2] | 1.8 | 1.7 | 2.9 | 2.9 | 5.3 | 5.2 | — | 4.0 | 4.0 |
| Needle flame test[b] Pass [yes/no] | Yes | Yes | NO | Yes | NO | Yes | NO | Yes | Yes |
| T180 test |  |  |  | Pass |  | Pass |  |  |  |
| T210 test |  | Fail |  | Pass |  | Pass |  |  |  |

[a]-- = very severe demoulding problems; + = demoulding without significant problems; ++ = very smooth demoulding behaviour
[b]plate thickness 1 mm; flam application time: 10 seconds

The invention claimed is:

1. A halogen free flame retardant moulding composition comprising (A) polymeric material, (B) a flame retardant system, (C) fibrous reinforcing agent and (D) a mould release agent, wherein
   (A) the polymeric material consists of at least 50 wt. %, relative to the total weight of the polymeric material, of a thermoplastic polyester;
   (B) the flame retardant system is present in an amount of 11-35 wt. %, relative to the total weight of (A), (B) and (C), and consists of:
      a) melamine cyanurate,
         and optionally one or more of the following flame retardant components:
      b) another phosphorus-free nitrogen based organic flame retardant compound,
      c) a phosphorus containing flame retardant excluding elementary phosphorus, in an amount of less than 1 wt. %, relative to the total weight of (A), (B) and (C):
      d) an inorganic flame retardant synergist, and
      e) an organic flame retardant synergist,
   (C) the fibrous reinforcing agent is present in an amount of 7-35 wt. %, relative to the total weight of (A), (B) and (C); and
   (D) the mould release agent is present in an amount of at least 0.01 wt. %, relative to the total weight of (A), (B) and (C).

2. The moulding composition according to claim 1 wherein the thermoplastic polyester in (A) is polyethylene terephthalate (PET), polytrimethylene terephthalate (PTT), polybutylene terephthalate (PBT), polyethylene napthalate (PEN), polytrimethylene napthalate (PTN), polybutylene napthalate (PBN) or any mixture or copolymer thereof.

3. The moulding composition according to claim 1, wherein the polymer composition (A) comprises another polymer different from the thermoplastic polyester.

4. The moulding composition according to claim 1, wherein melamine cyanurate is present in an amount of 11-35 wt. % relative to the total weight of (A), (B) and (C).

5. The moulding composition according to claim 1, wherein the optional flame retardant components (b)-(e) of the flame retardant system (B) are present in a total amount of 0-5 wt. %, relative to the total weight of (A), (B) and (C).

6. The moulding composition according to claim 1, wherein the fibrous reinforcing agent is present in an amount of 7-30 wt. %, relative to the total weight of (A), (B) and (C).

7. The moulding composition according to claim 1, wherein the mould release agent is a saturated fatty acid or a salt thereof, an ester or amide of saturated or unsaturated C10-C40 aliphatic carboxylic acids and saturated C2-C40 aliphatic alcohols or amines, or any combination thereof.

8. The moulding composition according to claim 1, wherein the mould release agent is present in an amount at 0.05-2 wt. % relative to the total weight of (A) (B) and (C).

9. The moulding composition according to claim 1, wherein the polyester composition consists of the components (A)-(D) and optionally (E) at least one other additive chosen from the group consisting of fillers, plasticizers, CTI improving agents, nucleating agents, stabilizers, dispersing aids, pigments and colorants.

10. The moulding composition according to claim 1, wherein the polyester composition consists of
   (A) the polymeric material consisting of at least 90 wt. %, relative to the total weight of the polymeric material, of PET, PTT, PBT or any mixture or copolymer thereof:
   (B) the flame retardant system consisting of melamine cyanurate in an amount of 11-35 wt %, and optionally one or more of the components (B-b), (B-c), (B-(d) and (B-e) in a total amount of (B-b), (B-c), (B-d) and (B-e), of 0-5 wt. %;
   (C) the fibrous reinforcing agent in an amount of 7-30 wt. %;
   (D) the mould release agent in an amount of 0.1-1 wt. %; and
   (E) 0-10 wt. % of at least one other additive, wherein the wt. % mentioned in (B), (C), (D) and (E) are relative to the total weight of (A), (B) and (C).

11. The moulding composition according to claim 1, wherein the composition comprises less than 1 wt. % epoxy containing compounds, relative to the total weight of the polyester composition.

12. A lampholder made of a moulding composition according to claim 1.

* * * * *